United States Patent [19]
Park et al.

[11] Patent Number: 5,747,690
[45] Date of Patent: May 5, 1998

[54] VIBRATORY MICROGYROSCOPE

[75] Inventors: Kyu-yeon Park; Chong-won Lee; Young-ho Cho, all of Taejon; Ci-moo Song, Sungnam, all of Rep. of Korea

[73] Assignees: Samsung Electronics Co., Ltd., Suwon; Korea Advanced Institute of Science and Technology, Taejon, both of Rep. of Korea

[21] Appl. No.: 773,990

[22] Filed: Dec. 26, 1996

[30] Foreign Application Priority Data

Dec. 27, 1995 [KR] Rep. of Korea ............... 95-59491

[51] Int. Cl.⁶ .............................................. G01P 9/00
[52] U.S. Cl. ............................... 73/504.12; 73/504.02
[58] Field of Search .................... 73/504.02, 504.04, 73/504.12, 504.14, 504.16, 504.18, 514.29; 361/280

[56] References Cited

U.S. PATENT DOCUMENTS

| | | | |
|---|---|---|---|
| 5,349,855 | 9/1994 | Bernstein | 73/504.16 |
| 5,359,893 | 11/1994 | Dunn | 73/504.12 |
| 5,604,312 | 2/1997 | Lutz | 73/504.12 |

*Primary Examiner*—Christine K. Oda
*Attorney, Agent, or Firm*—Burns, Doane, Swecker & Mathis, L.L.P.

[57] ABSTRACT

A microgyroscope includes a substrate, a vibratory structure having two stripe portions, a plurality of connection portions, and a comb, an elastic member for elastically maintaining the vibratory structure, a driver for applying the vibratory structure, a sensor for sensing the one directional action of the vibratory structure, and a plurality of sensing electrodes for sensing displacement by Coriolis force.

7 Claims, 6 Drawing Sheets

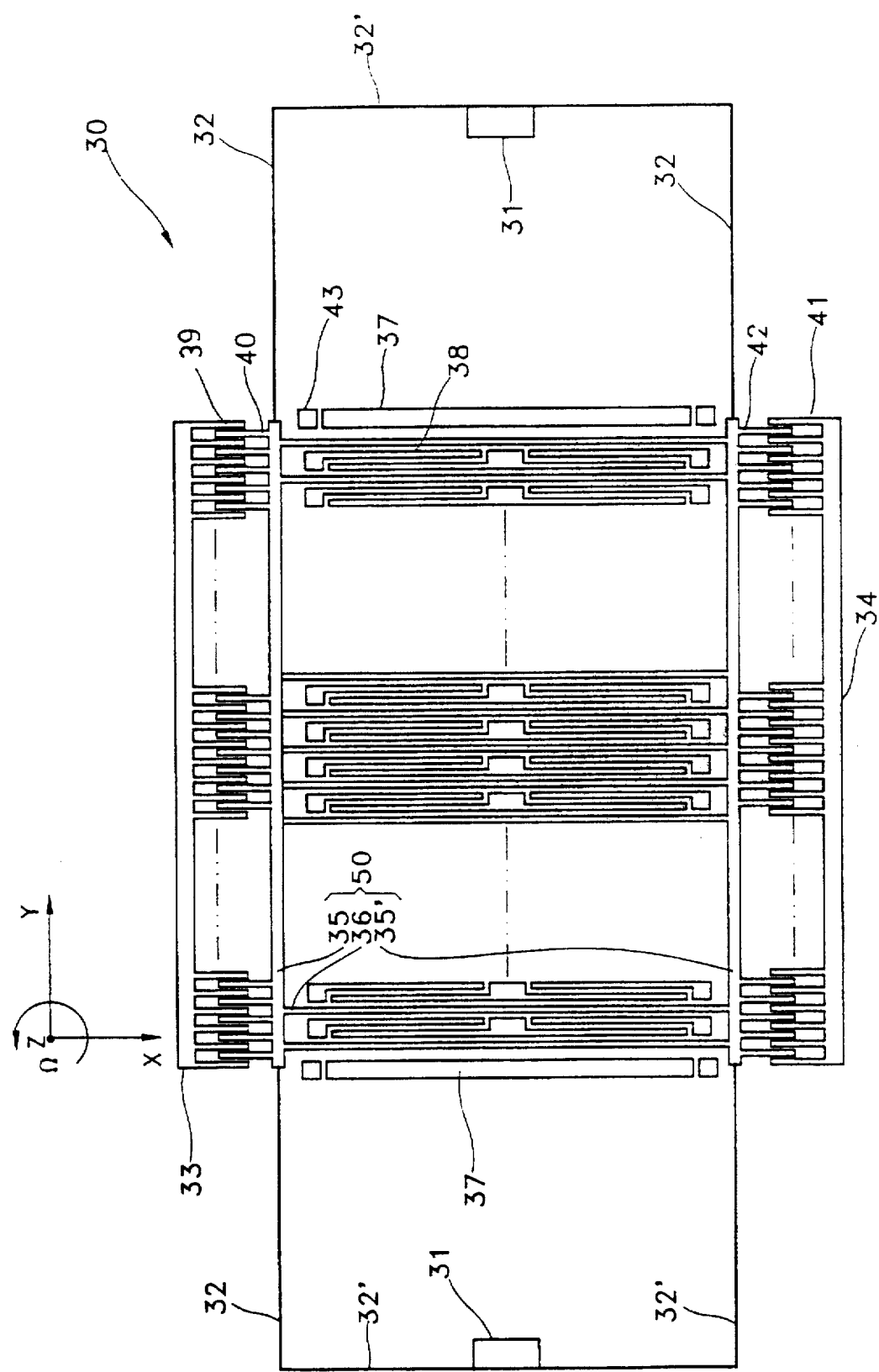

VIBRATORY MICROGYROSCOPE

BACKGROUND OF THE INVENTION

The present invention relates to a microgyroscope, and more particularly, to a microgyroscope having new type of a vibratory structure and a sensing electrode disposed on the same plane as that of the vibratory structure.

An angular velocity sensor i.e., gyroscope, for detecting angular velocity of an inertial object has been employed as a core part of a navigation apparatus for guided missiles, vessels or airplanes. The gyroscope is currently being employed extending its application fields as a navigation apparatus for automobiles or an apparatus for detecting and correcting hand quiver in a high-magnification video camera. A gyroscope for military or aeronautic purpose is manufactured through precision machining and an assembly process with a multitude of complex parts, provide precision performance. However, due to burdensome manufacturing costs and a large scale structure, such gyroscopes are not appropriate for general industrial purposes or use in home electrical products.

Recently, a small gyroscope with piezoelectric elements attached to a beam of a triangular prism has been developed by the Japanese company Murata, and which is employed as a hand-quiver sensor for small video cameras. Further, to overcome difficulties in manufacturing the gyroscope having piezoelectric elements, another Japanese company, Tokin, has developed another small gyroscope having a cylindric beam structure.

However, since both gyroscopes of the above two types require a precision machining, manufacturing of the same is difficult and expensive. Moreover, since the gyroscopes are made of a multitude of mechanical parts, it is difficult to be developed as part of an integrated circuit.

In the meantime, to improve shortcomings of the above-mentioned gyroscopes, a more economic and accurate gyroscope is under development using a micro machining technology.

The principle of the gyroscope is that when an inertial object which is uniformly vibrating or rotating in a first axis direction receives an input of angular velocity by rotation of a second axis direction perpendicular to the first axis direction, a Coriolis force generated in a third axis direction perpendicular to both first and second axes is detected to thereby detect rotation angular velocity. Here, if the forces applied to an inertial object could be made equal, accuracy of the angular velocity detection would be improved. In particular, it is preferable to make use of equal forces so as to improve linearity and enlarge the bandwidth of a signal.

In FIG. 1, a structure of a comb drive type gyroscope using a tuning fork mode developed by the Charles Stark Draper Laboratory, Inc. is illustrated, which is disclosed in U.S. Pat. No. 5,349,855. The gyroscope shown in FIG. 1 manufactured by the micro machining technology comprises a plane vibratory structure 11, springs 12 and 13 connected to the vibratory structure 11, and combs 14 for applying an electrostatic force to the vibratory structure 11. The vibratory structure 11 is spaced upward from a substrate (not shown) at a predetermined gap and is supported at support portions 15. As illustrated in the left side of the drawing, the area of the gyroscope can be divided into a surface electrode attached to the substrate, a suspended electrode spaced from the substrate at a predetermined space, and a support region for supporting the suspended electrode.

The micro gyroscope shown in FIG. 1 is operated by applying an electrostatic force using left and right motors with respect to the combs 14 formed at both sides of the vibratory structure 11. The electrostatic force generates vibration of the tuning fork mode in one direction parallel to the plane of FIG. 1. The movement of the vibratory structure 11 is detected from the change of the capacitance of the comb 20. When a voltage capable of inducing vibration satisfying the limit cycle is applied to the left and right motors, the vibratory structure 11 continuously vibrates at a natural frequency.

If the vibratory structure 11 rotates in a direction perpendicular to that of vibration thereof during vibrating movement due to the electrostatic force, the Coriolis force is generated. Such a Coriolis force displaces the vibratory structure 11 in a direction perpendicular to the plane of FIG. 1. The displacement acts as a torsion force with respect to the vibratory structure 11. The torsion of the vibratory structure 11 is detected from the change of capacitance by electrodes 22 disposed at two portions under the vibratory structure 11, from which Coriolis force can be measured. As the vibratory structure 11 is distorted in the direction perpendicular to the plane, an electrostatic force is generated by torque electrodes 23 as an equilibrium method of forces. The torque electrode 23 for making the torsion forces equal is disposed each at two portions under the vibratory structure 11 in a diagonal direction.

The gyroscope according to the conventional technology as illustrated in FIG. 1 has the following problems.

First, it is very difficult to coincide natural frequencies of the vibratory structure 11 with each other in the vibration directions. That is, the planar vibratory structure 11 generally vibrates horizontally as shown in FIG. 2A or vertically as shown in FIG. 2B, and each natural frequency of the vibration in both directions should be coincided. To adjust that, the thickness and width of the springs 12 and 13 (in FIG. 1) for supporting the vibratory structure 11 should be defined within a range of predetermined machining errors, which are several to tens of angstroms. Since the processes for machining the thickness and width of the springs 12 and 13 are separated from each other, the coincidence of each natural frequency of the vibration in both directions is very arduous. If the natural frequencies are not adjusted in each manufacturing process, an additional process for adjusting the natural frequencies may be performed. However, that process is very difficult.

To measure the displacement of vibratory structure 11 due to the Coriolis force, the predetermined gap should be maintained between electrodes 22 and 23 attached to the substrate and the vibratory structure 11. Since the sensitivity of the gyroscope is inversely proportional to the square of the gap distance, it is advantageous to shorten the gap distance in order to increase the sensitivity of the gyroscope. However, since a uniform DC current is applied to the sensor electrodes 22, the vibratory structure 11 sticks to the surfaces of the sensor electrodes 22 when the gap is considerably narrow. Further, since the change of the capacitance between the surface electrodes 22 and 23 and the vibratory structure 11 is inversely proportional to the square of the gap distance, the linearity of an output with respect to an angular velocity is not good. Additionally, to enhance its sensitivity, the vibratory structure 11 should be designed to be capable of being vibrated greatly in the direction perpendicular to the plane. The greater the displacement of the vibratory structure 11 is, however, the worse the sticking phenomenon of the vibratory structure 11 becomes.

In the gyroscope of FIG. 1, the torque electrodes 23 are installed at the two diagonal positions under the vibratory structure 11 to prevent the sticking phenomenon of the vibratory structure 11. However, when voltage is applied to one of the torque electrodes 23, the gap distance between the substrate and the vibratory structure 11 over the other torque electrode 23 diagonally disposed on the opposite side becomes narrower. If the rigidity of the springs 12 and 13 is enhanced to compensate for this kind of defects, the natural frequency of the gyroscope is consequently raised negatively affecting the sensitivity of the gyroscope. Thus, the gap distance has considerable limitations, consequently leading to fatal limitation on resolution, used frequency and linearity of the gyroscope.

SUMMARY OF THE INVENTION

To solve the above problems, it is an object of the present invention to provide a microgyroscope having a new type of vibratory structure.

It is another object of the present invention to provide a microgyroscope in which the displacement of the vibratory structure can be sensed by a sensing means disposed on the same plane as that of the vibratory structure.

It is still another object of the present invention to provide a microgyroscope where the position control of the vibratory structure is operated by a position control means disposed on the same plane as that of the vibratory structure.

It is yet another object of the present invention to provide a microgyroscope having an excess vibration prevention means.

Accordingly, to achieve the above objects, there is provided a microgyroscope comprising: a substrate; a vibratory structure having first and second stripe portions disposed in parallel with each other in which first and second combs are formed at one side of the first and second stripe portions respectively, and a plurality of connecting portions for connecting the first and second stripe portions; elastic means for elastically supporting the vibratory structure to be spaced from the substrate at a predetermined gap; driving means, having a third comb interposed between the first comb of the first stripe portion, for applying the vibratory structure in one direction due to an electrostatic force; sensing means, having a fourth comb interposed between the second comb of the second stripe portion, for sensing the movement of the vibratory structure driven by the driving means through change of capacitance; and a plurality of sensing electrodes, disposed between the connecting portions of the vibratory structure on the same plane as that of the vibratory structure to be spaced from the substrate at a predetermined gap, for sensing displacement of the vibratory structure due to Coriolis force through change of capacitance.

It is preferred in the present invention that the microgyroscope further comprises position control electrodes arranged on the same plane as that of the vibratory structure, spaced from the substrate at a predetermined gap, in parallel with the connection portion of the vibratory structure in order to restrain an excess displacement of the vibratory structure due to Coriolis force.

It is also preferred in the present invention that the microgyroscope further comprises an excess action prevention member for preventing the vibratory structure from being excessively deformed by Coriolis force from contacting the sensing electrodes.

BRIEF DESCRIPTION OF THE DRAWINGS

The above objects and advantages of the present invention will become more apparent by describing in detail a preferred embodiment thereof with reference to the attached drawings in which:

FIG. 3 is a plan view illustrating a microgyroscope according to the present invention;

DETAILED DESCRIPTION OF THE INVENTION

Figure 1:
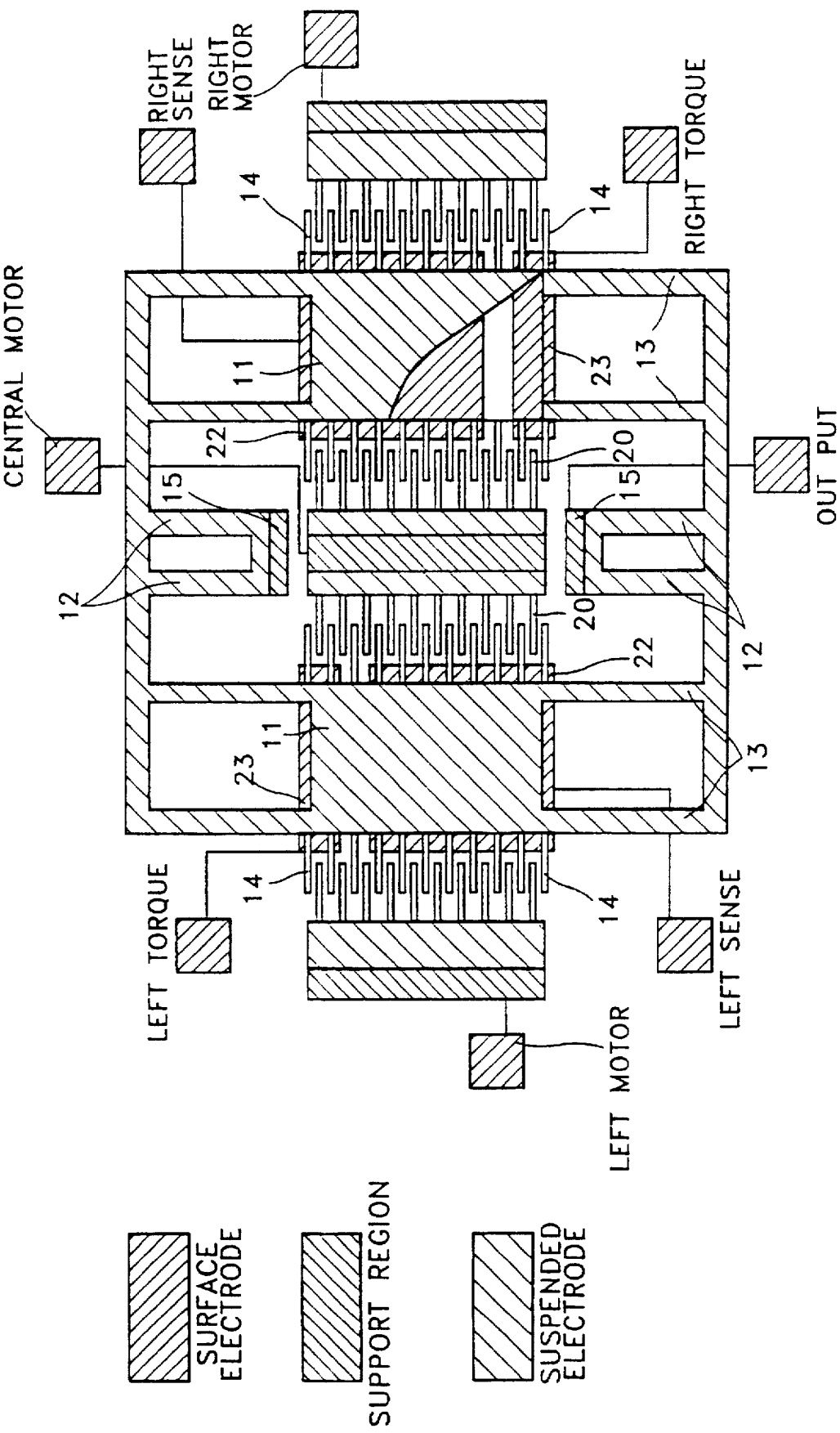
FIG. 1 is a plan view illustrating a conventional microgyroscope.
Figure 2A:
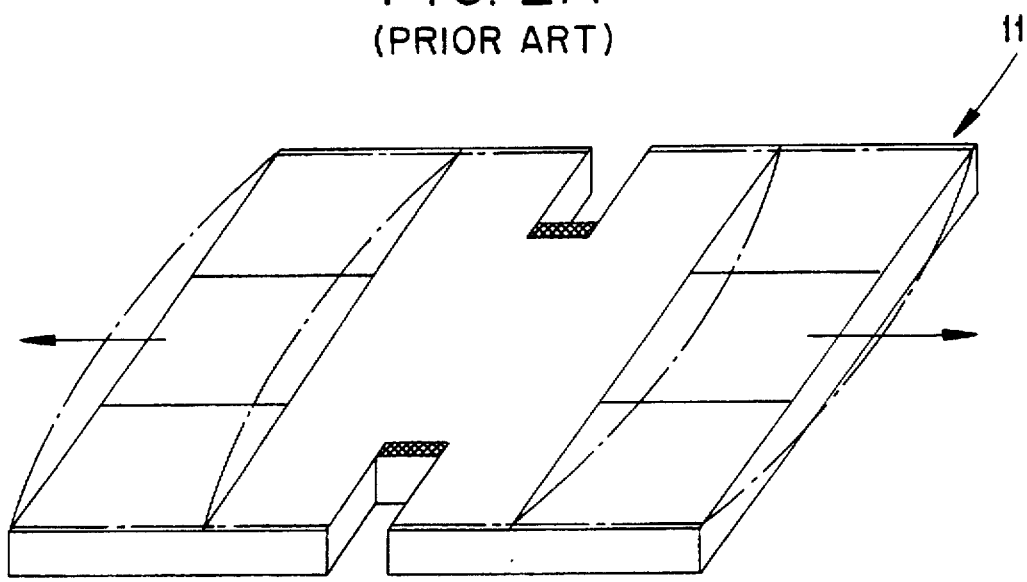
FIGS. 2A and 2B are perspective views illustrating a state where a vibratory structure of microgyroscope vibrates.
Figure 2B:
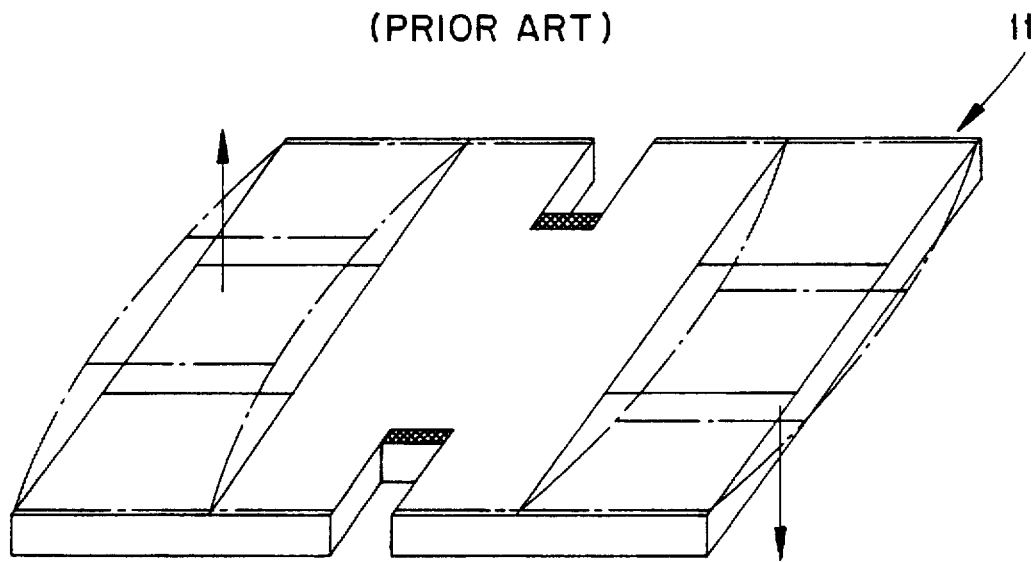

FIG. 3 is a schematic plan view of a microgyroscope 30 according to the present invention. A vibratory structure 50 of the present microgyroscope 30 includes two stripe portions 35 and 35' disposed in parallel with each other, and a plurality of connecting portions 36 arranged to be perpendicular to the stripe portions 35 and 35' and for connecting therewith. The vibratory structure 50 overall assumes the form of a ladder. The stripe portions 35 and 35' of the vibratory structure 50 are supported by support springs 32 extended in a length direction of two stripe portions 35 and 35' and connection spring 32' connected to each end of the support springs 32. The connection springs 32' are supported by support 31. The supports 31 serves to support the vibratory structure 50 with the predetermined gap distance via springs 32 and 32'.

Combs 40 and 42 are formed at one side of the stripe portions 35 and 35' of the vibratory structure 50. The combs 40 and 42 are extended in a width direction of the stripe portions 35 and 35'. The combs 40 and 42 are arranged between combs 39 and 40 formed at one side of a driver 33 and a sensor 34, respectively. The vibratory structure 50 is made to vibrate by an electrostatic force occurring between the combs 39 and 40, and a vibratory state of the vibratory structure 50 can be detected from the change of capacitance occurring between the combs 41 and 42.

The driver 33 for vibrating the vibratory structure 50 is disposed in parallel with the stripe portion 35 and has the comb 39. As explained above, comb 39 of driver 33 is interposed between the comb 40 of the stripe portion 35. Since the electrostatic force is generated between the combs 39 and 40 when voltage is applied to the driver 33, the vibratory structure 50 can be vibrated in an X-axis direction.

The sensor 34 for sensing the vibration of the vibratory structure 50 is disposed in parallel with the stripe portion 35'. The comb 41 is formed at the sensor 34, which is interposed between the comb 42 of the stripe portion 35'. The vibration of the vibratory structure 50 sensed by the sensor 34 is fed back to driver 33, and then, voltage for generating vibration satisfying a limit cycle is applied to the driver 33.

Figure 4:
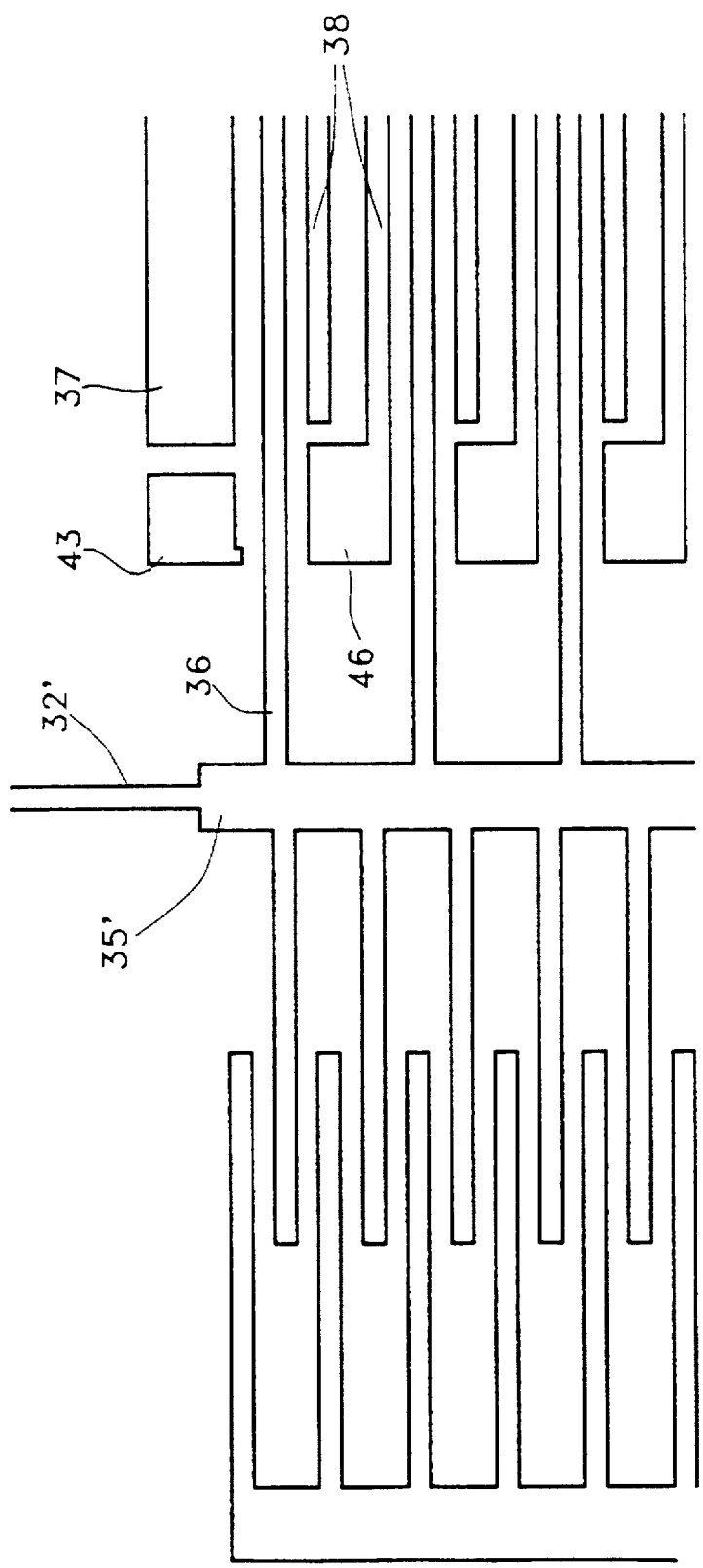
FIGS. 4 and 5 are partially enlarged views of FIG. 3.
Figure 5:
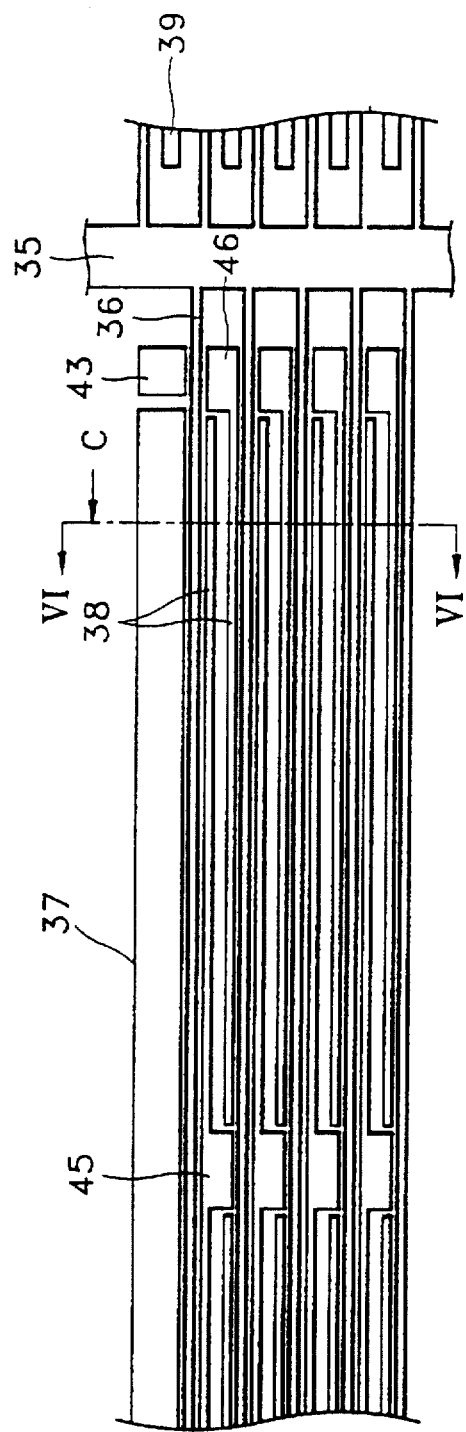

If an angular velocity is applied in a z-axis direction perpendicular to the plane, displacement of the vibratory structure 35, 35' and 36 due to Coriolis force occurs in a y-axis disposed to sense such displacement. As can be seen in FIGS. 4 and 5 each illustrating a partially enlarged view of FIG. 3, the sensing electrodes 38 are arranged along the lengthwise direction between the connecting portions 36 for connecting the stripe portions 35 and 35'.

Figure 6:
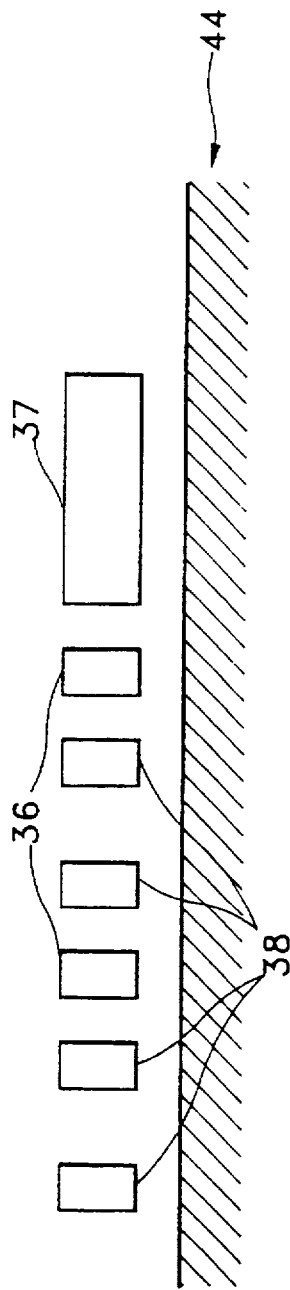
FIG. 6 is a vertical sectional view taken along line VI—VI in FIG. 5.

Referring to FIG. 6, it can be seen that the sensing electrodes 38 are installed to be spaced from a substrate 44 at the same height as that of the vibratory structure 50. Thus, sensing electrode 38 are arranged on the same plane as that of vibratory structure 50. As shown in FIG. 5, a set of three sensing electrodes 38 are relatively close to that of the connecting portions 36, and supported on the substrate 44 at a middle portion thereof indicated by a reference numeral 45. The length of the two remaining sensing electrodes is close to half the length of the other sensing electrode, and supported on substrate 44 at one end portion thereof indicated by a reference numeral 46. The two sensing electrodes aligned in a lengthwise direction are arrayed to be parallel with the longer sensing electrode.

Electrodes 37 for controlling a position of the vibratory structure 50 is arranged in parallel with connecting structure 36. The position control electrode 37 are installed to be spaced from the substrate 44 at a predetermined height as shown in FIG. 6, and accordingly, arranged on the same plane as that of the vibratory structure 50. The position control electrode 37 serves to control the movement of the vibratory structure 50 in the Y-axis direction by Coriolis force.

There are two purposes performing the position control by regular position control electrode 37.

The first purpose is to guarantee linearity of the gyroscope. Since the sensor for sensing the displacement of the vibratory structure has a non-linearity property beyond certain range, linearity of an output of the gyroscope becomes inferior when the displacement in the Y-axis becomes large. Accordingly, by restraining the displacement in the Y-axis direction to thereby limit action of the sensor in a section where linearity is guaranteed, the linearity of the gyroscope can be guaranteed.

The second purpose is to enhance resolution and measurement range of the gyroscope. To enhance the resolution of the gyroscope, the displacement due to Coriolis force should be greatly generated. However, when an excess displacement occurs, the vibratory structure collides with the sensing electrode, so that the measurement range should be limited. Accordingly, in designing the vibratory structure, it is efficient in view of the linearity and resolution in sensing to measure the displacement that the vibratory structure itself is made to have great displacement and instead the regular position control for restraining the displacement is performed. An excess action prevention member, indicated by a reference numeral 43 in FIGS. 3 to 5, is arranged at both ends of the position control electrode 37. The excess action prevention member 43 is arranged such that the connecting portions 36 can contact primarily the excess action prevention member 43 prior to contacting the sensing electrode 38 when the connecting portions 36 has an excess displacement in the Y-axis direction due to Coriolis force.

The operation and structural principle of the gyroscope according to the present invention will now be described.

Figure 7:
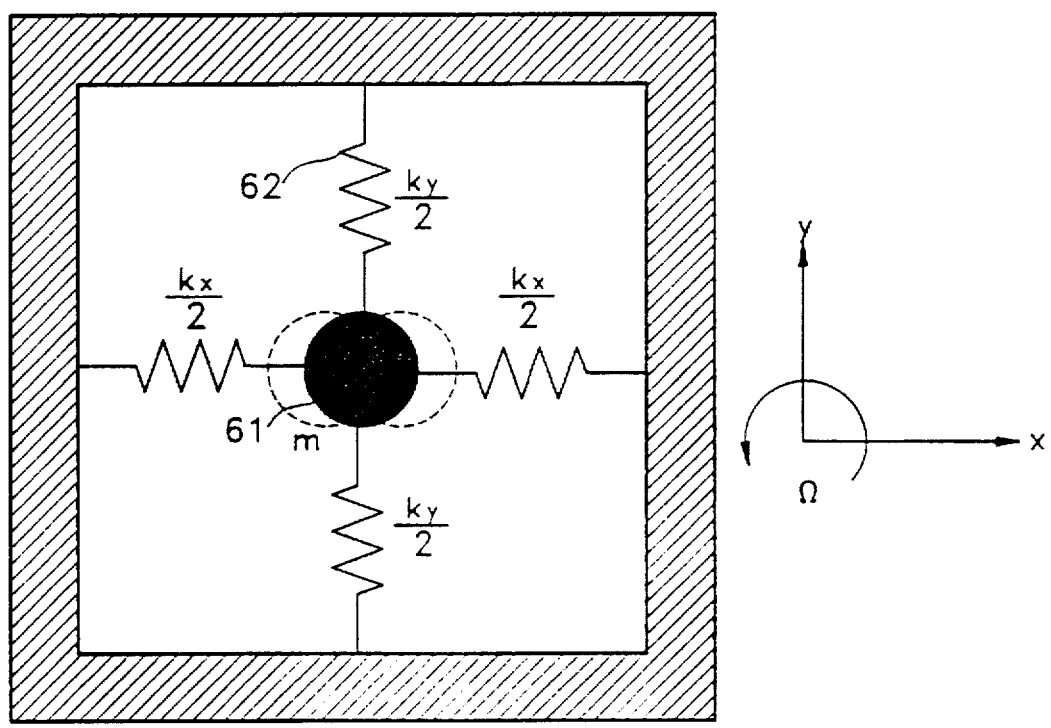
FIG. 7 is a view illustrating an example of a general vibration mechanism.

FIG. 7 illustrates a vibration system such as a gyroscope by modeling the same. A vibratory structure 61 having mass "m" is supported by each spring 62 in X-axis and Y-axis directions. In such a vibration system, an external force (f) for applying vibration to the vibratory structure 61 in the X-axis direction can be expressed as following equation.

$$F = F \sin(\omega t)$$

Here, displacement and velocity of the vibratory structure 61 moving in X-axis direction can be expressed as follows.

$$x = -\left(\frac{FQ_x}{k_x}\right) \cos(\omega t)$$

and $$v = \left(\frac{FQ_x \omega}{k_x}\right) \sin(\omega t)$$

Here, x is displacement in X-axis direction, and $V_x$ is velocity of the vibratory structure in X-axis direction. The displacement (y) occurring in Y-axis direction due to Coriolis force generated in proportion to an input angular velocity is calculated by following equation.

$$y = -\left(\frac{2FQ_xQ_y}{\omega k}\right) \Omega \sin(\omega t)$$

Here, $Q_x$ and $Q_y$ are constants Q with respect to X- and Y-axes direction, respectively, and $\Omega$ is input angular velocity. Thus, rotation angular velocity of an inertial object can be measured by detecting the displacement of "y."

In gyroscope 30 (see FIG. 3) of the present invention where mass of the vibratory structure 50 is m, and when AC voltage corresponding to the natural frequency is applied to the driver 33, vibration in the X-axis direction is generated due to an electrostatic force between the combs 39 and 40. The electrostatic force of the driver 33 can be expressed in the following equation.

$$f_x = \frac{\epsilon t n_x V^2}{h}$$

Here, $f_x$ is the electrostatic force; $\epsilon$ is a dielectric constant of air; t is thickness of the combs 39 and 40; $n_x$ is the number of pairs of the combs 39 and 40; V is driving voltage; and h is distance between the combs 39 and 40.

The vibratory structure 50 receiving such a driving force vibrates with the natural frequency. To maintain the vibration with the natural frequency, the sensor 34 senses the vibration, voltage satisfying the limit cycle is generated with a reference of the sensed vibration, and then such a voltage is applied to actuated the driver 33.

When a rotation angular velocity is input to the oscillating vibratory structure 50, the vibratory structure 50 vibrates in the X-axis direction in FIG. 3, while concurrently displaced in the Y-axis direction. The displacement of the vibratory structure 50 can be expressed by the above equation with respect to "y". Such a displacement triggers change of capacitance formed between the sensing electrode 38 and the stripe portions 36. Sensing electrode 38 is formed in the two lines where three sensing electrodes are arrayed in parallel as described above referring to FIG. 5, and forms a pair made of an anode and a cathode. Since the change of the capacitance of the anode and the cathode each occurs inversely, the displacement of the vibratory structure 50 in the Y-axis direction can be detected by calculating the difference of the capacitance occurring between the two electrodes. The difference AC of the capacitance between the two electrodes can be expressed in the following equation.

$$\Delta C = y\left(\frac{2\epsilon l_s n_s}{h_s^2}\right)$$

Here, $n_s$ is the number of pairs of sensing electrodes 38; $\epsilon$ is the dielectric constant of air; $l_s$ is the length of sensing electrode 38; t is thickness between connecting portions 36 facing that of the sensing electrode 38; and $h_s$ is gap distance between the sensing electrode 38 and the connecting portions 36. Since a voltage signal proportional to the change of the capacitance can be detected by using a general circuit for detecting the change of the capacitance, an angular velocity signal can be consequently detected.

In the meantime, as a common factor for determining performance of a microgyroscope, congruity of the natural frequencies in the X- and Y-axes is necessary to maximize displacement in the Y-axis by Coriolis force. In the present invention, since stiffness of the vibratory structure 50 in the Y-axis direction is affected by an electrostatic force generated by the sensing electrode 38, the natural frequency can be adjusted using such a electrostatic force. The natural frequency ($f_n$) in the Y-axis direction can be expressed by the following equation.

$$f_n = \frac{1}{2\pi} \sqrt{\frac{k_b - k_n}{m}}$$

Here, $k_b$ is a spring constant of the springs 32 and 32', and $k_n$ is a spring constant generated by the electrostatic force between the sensing electrode 38 and the connecting portions 36. $k_n$ can be expressed by the following equation.

$$k_n = V_b^2 \left( \frac{2\epsilon l_s t n_s}{h_s^3} \right)$$

In the above equation, $\epsilon$ is the dielectric constant of air; $l_s$ is the length of the sensing electrode 38; $h_s$ is the gap distance between the sensing electrode 38 and the connecting portions 36; $V_b$ is a bias voltage applied to sensing electrode 38. The congruity of the natural frequencies in the X-axis direction and of the Y-axis direction can be achieved by adjusting the bias voltage. However, since the change of an output is caused in the microgyroscope when the bias voltage of the sensing electrode 38 varies in such an adjusting fashion, a more accurate adjustment can be performed using another method of fixing the bias voltage of the sensing electrode 38 and installing an additional electrode for adjusting the natural frequency. The electrode for adjusting the natural frequency (not shown) is arranged in parallel with the connection portions 36 of vibratory structure 50 in a form similar to sensing electrode 38.

As described above, the microgyroscope according to the present invention adopting a new vibratory structure and the sensing electrode has merits of solving problems in machining the vibratory structure and simultaneously improves performance thereof. Also, contrary to the conventional technology where adjustment of the natural frequency of the vibratory structure in two directions is difficult, each factor for determining the natural frequency is determined in a single process and the performance becomes stable. In particular, the work of squaring the natural frequencies with each other renders efficient since the work can be performed by applying the bias voltage to the sensing electrode instead physically machining the vibratory structure. Further, since the position control can be efficiently performed by the position control electrode, linearity and resolution can be enhanced and measurement range thereof are enhanced.

What is claimed is:

1. A microgyroscope comprising:
   a substrate;
   a vibratory structure having first and second stripe portions disposed in parallel with each other in which first and second combs are formed at one side of said first and second stripe portions respectively, and a plurality of connecting portions for connecting said first and second stripe portions;
   elastic means for elastically supporting said vibratory structure to be spaced from said substrate at a predetermined gap;
   driving means, having a third comb interposed between said first comb of said first stripe portion, for applying said vibratory structure in one direction due to an electrostatic force;
   sensing means, having a fourth comb interposed between said second comb of said second stripe portion, for sensing the movement of said vibratory structure driven by said driving means through a change of capacitance; and
   a plurality of sensing electrodes, disposed between said connecting portions of said vibratory structure on the same plane as that of said vibratory structure to be spaced from said substrate at a predetermined gap, for sensing displacement of said vibratory structure due to Coriolis force through a change of capacitance.

2. A microgyroscope according to claim 1, further comprising position control electrodes arranged on the same plane as that of said vibratory structure, spaced from said substrate at a predetermined gap, in parallel with said connection portions of said vibratory structure in order to restrain an excess displacement of said vibratory structure due to Coriolis force.

3. A microgyroscope according to claim 1, further comprising an excess action prevention member for preventing said vibratory structure excessively deformed by Coriolis force from contacting said sensing electrodes.

4. A microgyroscope according to claim 1, wherein first portions of said elastic means are extended in a direction perpendicular to said first and second stripe portions, second portions of said elastic means connecting ends of said first portion of said elastic means to each other, and further comprising supports formed at the middle of said second portions of said elastic means so that said vibratory structure is elastically maintained spaced from said substrate at said predetermined gap.

5. A microgyroscope according to claim 1, wherein three portions of said sensing electrodes are arranged in two parallel rows between said connection portions of said vibratory structure, wherein a longer portion among said three portions includes a support in a middle portion thereof and two shorter portions among said three portions each include a support at one end thereof, said three portions being axially aligned.

6. A microgyroscope according to claim 1, wherein the natural frequency of said vibratory structure can be adjusted by changing voltage applied to said sensing electrodes.

7. A microgyroscope according to claim 1, further comprising an electrode disposed in parallel with said connecting portions of said vibratory structure, for adjusting the natural frequency of said vibratory structure.

* * * * *